W. L. GUMPRECHT.
COMBINED TYPEWRITING AND COMPUTING MACHINE.
APPLICATION FILED OCT. 21, 1916.
1,356,916.
Patented Oct. 26, 1920.
6 SHEETS—SHEET 1.
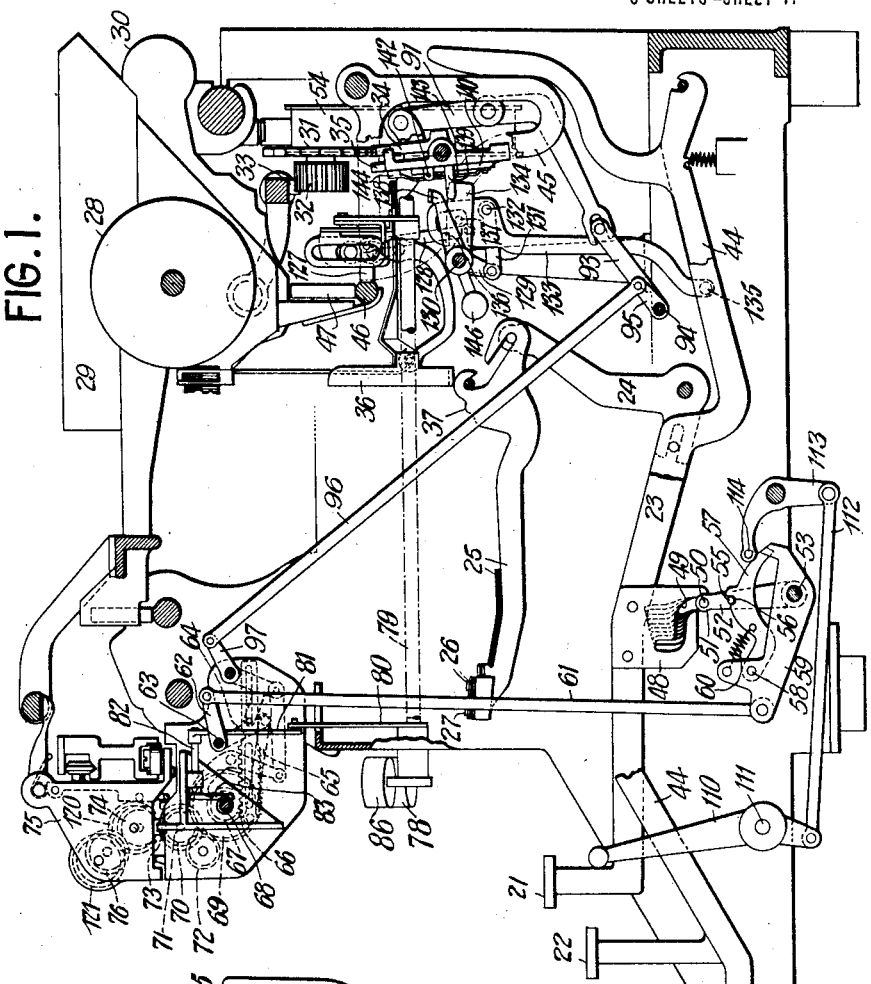
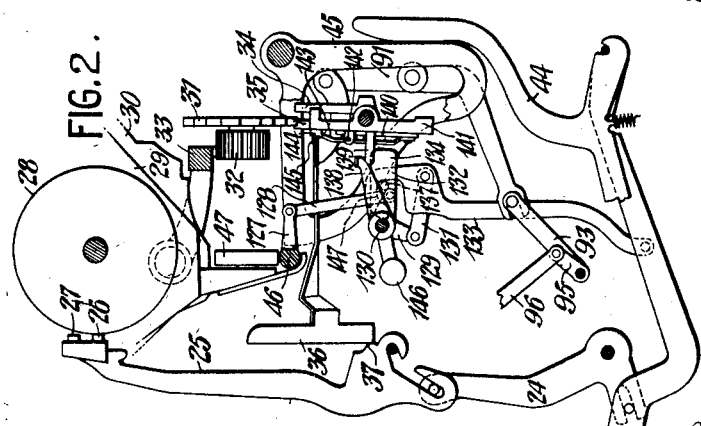
WITNESSES:
Arthur A. Johnson
Julius Duchatme
INVENTOR:
William L. Gumprecht
BY B C Stickney
ATTORNEY.

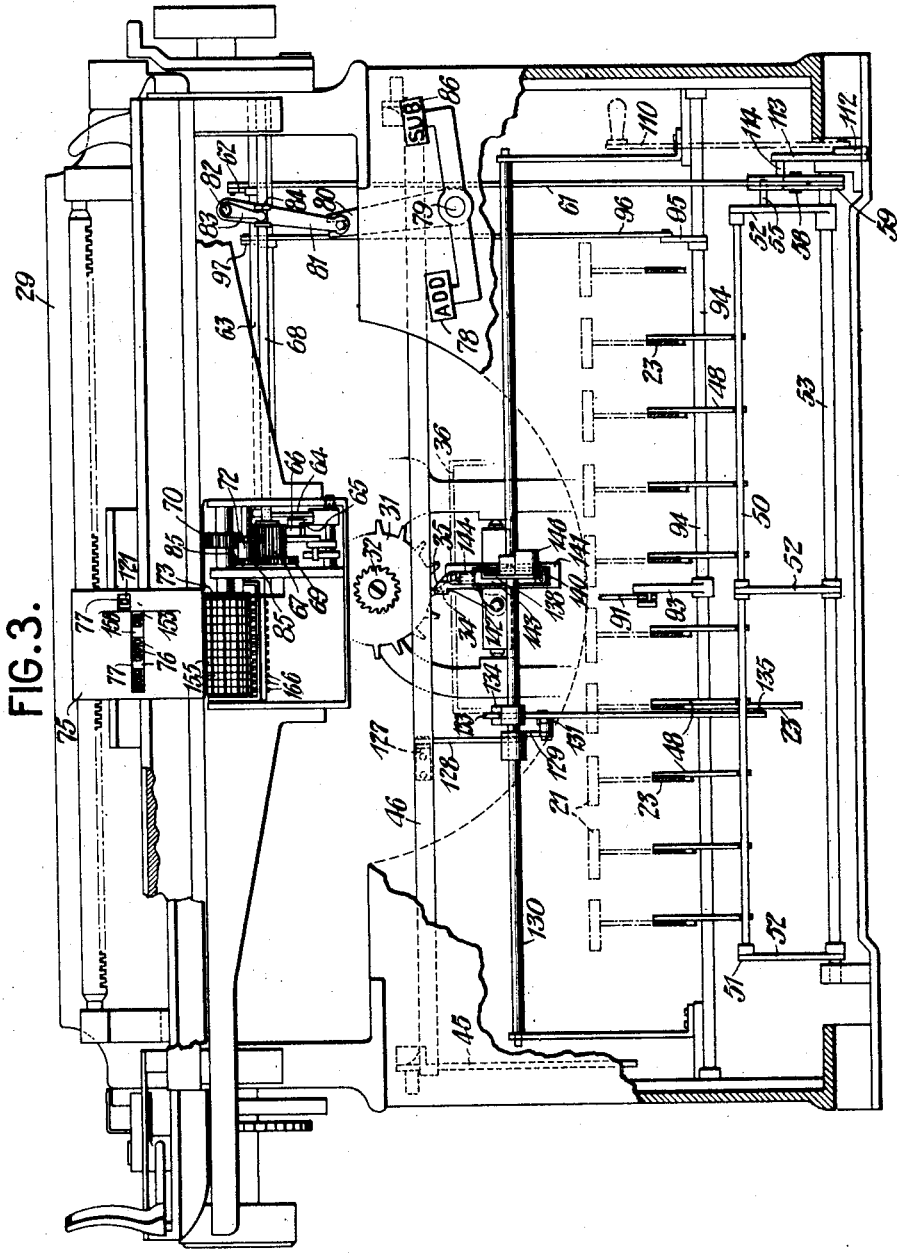

W. L. GUMPRECHT.
COMBINED TYPEWRITING AND COMPUTING MACHINE.
APPLICATION FILED OCT. 21, 1916.

1,356,916.

Patented Oct. 26, 1920.
6 SHEETS—SHEET 3.

WITNESSES:
Arthur A. Johnson
Julius Ruckstine

INVENTOR:
William L. Gumprecht
BY B. C. Stickney
ATTORNEY.

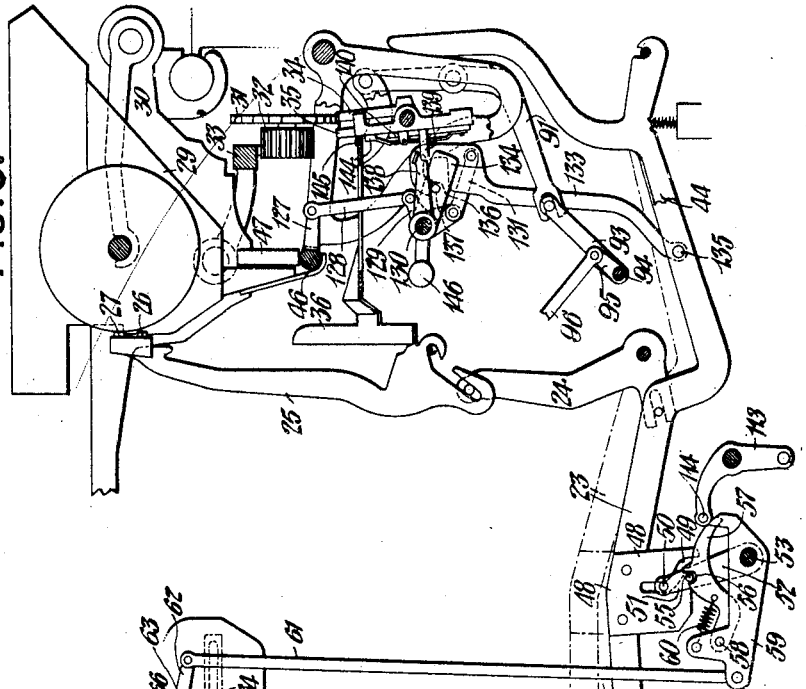

W. L. GUMPRECHT.
COMBINED TYPEWRITING AND COMPUTING MACHINE.
APPLICATION FILED OCT. 21, 1916.
1,356,916.
Patented Oct. 26, 1920.
6 SHEETS—SHEET 5.
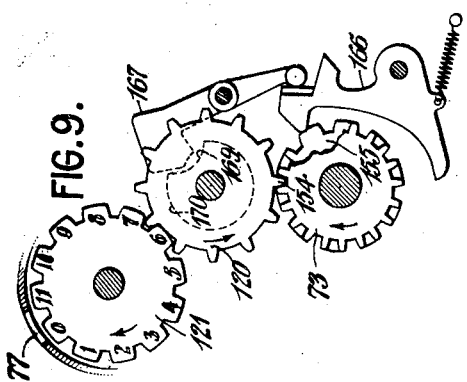
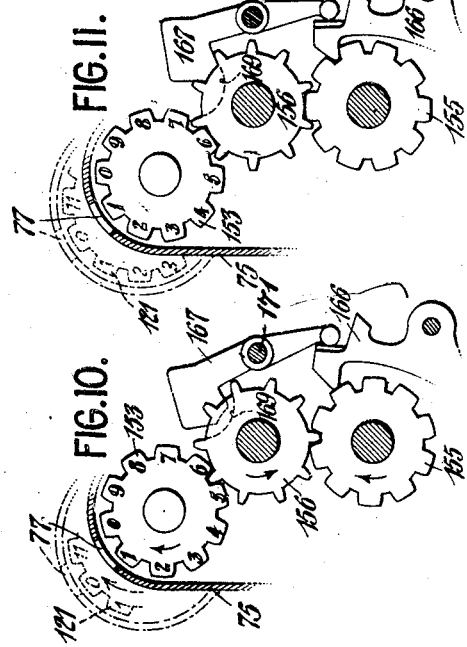
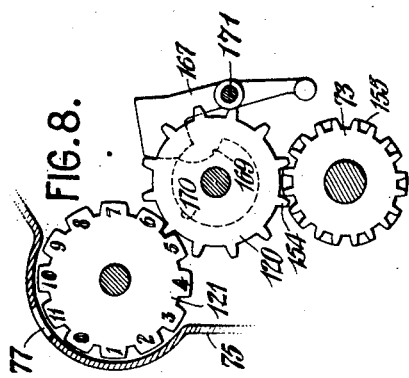
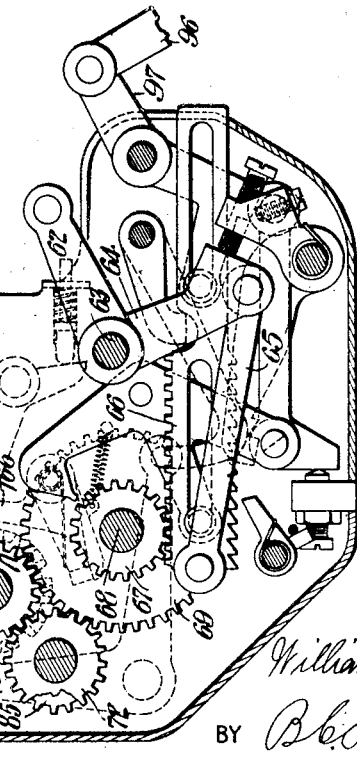
INVENTOR:
William L. Gumprecht
BY B.C. Stickney
ATTORNEY.
WITNESSES:

W. L. GUMPRECHT.
COMBINED TYPEWRITING AND COMPUTING MACHINE.
APPLICATION FILED OCT. 21, 1916.
1,356,916.
Patented Oct. 26, 1920.
6 SHEETS—SHEET 6.
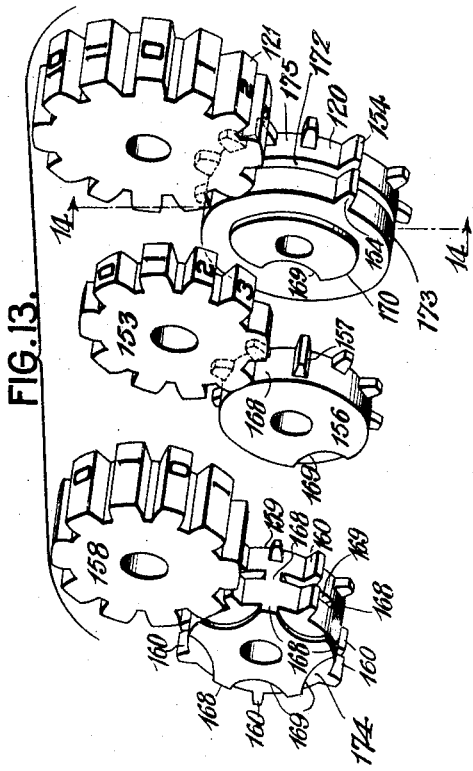
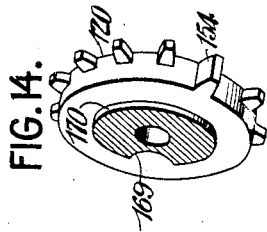
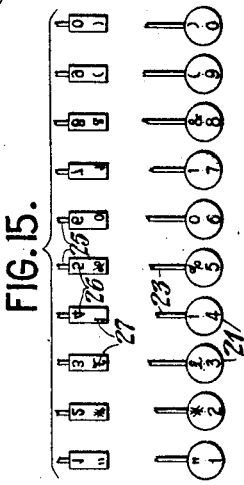
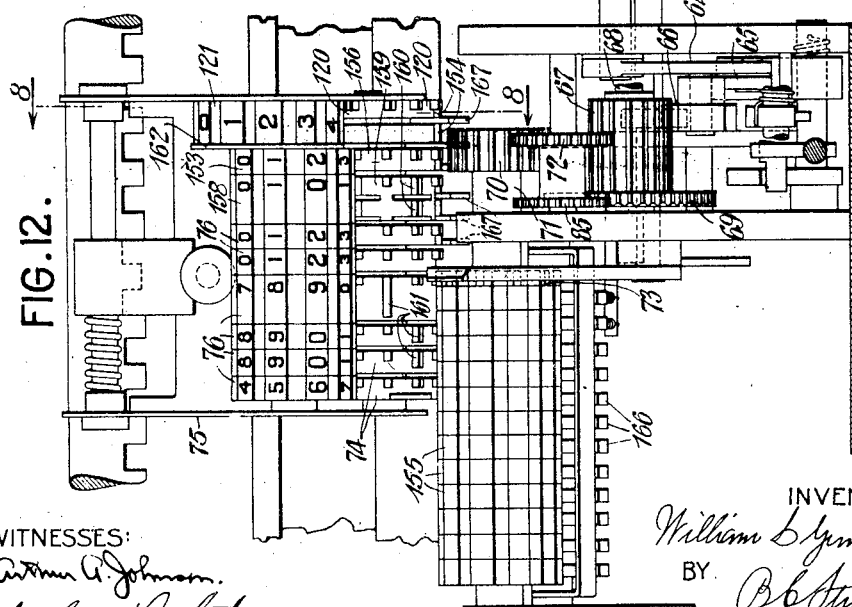
WITNESSES:
INVENTOR:
William L Gumprecht
BY
ATTORNEY.

UNITED STATES PATENT OFFICE.

WILLIAM L. GUMPRECHT, OF HARTFORD, CONNECTICUT, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,356,916.      Specification of Letters Patent.      Patented Oct. 26, 1920.

Application filed October 21, 1916. Serial No. 126,827.

*To all whom it may concern:*

Be it known that I, WILLIAM L. GUMPRECHT, a subject of the King of Great Britain, residing in Hartford, in the county of Hartford and State of Connecticut, have invented certain new and useful Improvements in Combined Typewriting and Computing Machines, of which the following is a specification.

My invention relates to computing machines, and is herein disclosed as applied to a combined typewriting and computing machine, in which the numeral keys of the typewriter control the computing devices, and is more especially illustrated as an improvement on the invention described in the application of Henry L. Pitman, Serial No. 81,574, filed March 2, 1916, and on the application of Frederick A. Hart, Serial No. 70,898, filed January 8, 1916 (now Patent No. 1,285,150, dated November 19, 1918).

In said machines, the numeral keys of the typewriter are connectible to actuate a master wheel, the actuation being effected by a reciprocating rack which is adapted to drive said master wheel on one stroke, but is out of mesh with the connections to said master wheel on its return stroke. My invention is also an improvement on the invention described in the application of Gustave O. Degener and Elias Saunders Serial No. 667,464, filed December 23, 1911 (now Patent No. 1,203,988, dated November 7, 1916).

The object of the present invention is to improve the computing mechanism of this general class of machines, with a view of providing a simple mechanism adapted to be easily operated by the typist, and to effect both addition and subtraction according to the British monetary standard.

I have found it advantageous to so construct the totalizer of my machine that the pence element thereof, which is of an ultra-decimal system, will co-act with the master wheel and carry-over mechanism in the same manner as the other denominational elements of the totalizer, which are of a decimal system, said master wheel and carry-over action being the same, even though the wheels of the pence element of the totalizer are of a different diameter than the wheels of the elements of higher order.

I have also found it advantageous to so construct the mechanism embodying my invention that the typewriter used in combination therewith will be provided with the usual number of type keys, it being unnecessary, as heretofore, to provide special numeral keys to actuate the pence element of the totalizer.

I have also found it advantageous to silence the typewriter carriage escapement mechanism during the computations of "10" or "11" pence, so that the typewriter carriage will move only one letter-space in letter-feeding direction during said computation, the type for the purpose being so set on the type-bars as to print legibly the numeral "10" or "11" on the work-sheet at the actuation of the corresponding numeral keys. The mechanism is so constructed that the typewriter carriage will not move at the actuation of the numeral key in tens of pence place, but will be allowed to move one letter-space after the printing of a numeral in units of pence place.

I have also found it advantageous to place the numerals on the type-bars to be used in printing "10" or "11" pence during a simultaneous computation, in upper-case type, and to connect the case-shift mechanism of the typewriter so as to silence the escapement mechanism of the typewriter carriage, as aforesaid, during the addition or subtraction of ten or eleven pence.

Other features and advantages will hereinafter appear.

In the accompanying drawings,

Figure 1 is a general sectional side elevation taken on different vertical planes, and showing the typewriter and its connections to the computing mechanism.

Fig. 2 is a diagrammatic side view, showing the "4" numeral key depressed when writing in lower-case, and associated parts, when computing four.

Fig. 3 is a general front elevation of the typewriter and computing mechanism, with parts broken away and parts omitted for clearness.

Fig. 5 is a diagrammatic side view, showing the position of the parts at the depression of the typewriter case-shift key.

Fig. 6 is a diagrammatic side view, showing the position of the parts at the depression of the "4" numeral key when the shift mechanism is in upper-case position, as in Fig. 4, the type-bar and its associate parts actuated to print in tens of pence denominational position, and when part of the pence computation has taken place.

Fig. 7 is an enlarged sectional side view of the totalizer and associated master-wheel mechanism.

Fig. 8 is a diagrammatic sectional side view, taken on the line 8—8 of Fig. 12, showing the pence element of the totalizer at rest, exhibiting "11" pence at the sight opening.

Fig. 9 is a view similar to Fig. 8, showing the action of the pence element when the pence dial wheel moves from "11" to "0" at the sight opening, and showing a carry-over action from the pence element to the units of shillings element.

Fig. 10 is a side view similar to Fig. 9, showing the action of the units of shillings element corresponding to the position of parts of the pence element shown in Fig. 9.

Fig. 11 is a side view similar to Fig. 10, showing the units of shillings element at the completion of the action illustrated in Fig. 10.

Fig. 12 is an enlarged detail front view of the totalizer, master wheel, and adjacent mechanism, with parts broken away for clearness.

Fig. 13 is a dissected perspective view, showing the pence element, units of shillings element, and tens of shillings element of the totalizer.

Fig. 14 is a sectional perspective view on the line 14—14 of Fig. 13, of the pence computing wheel.

Fig. 15 is a diagrammatic detail plan view of the numeral keys and associated type.

Figure 4:
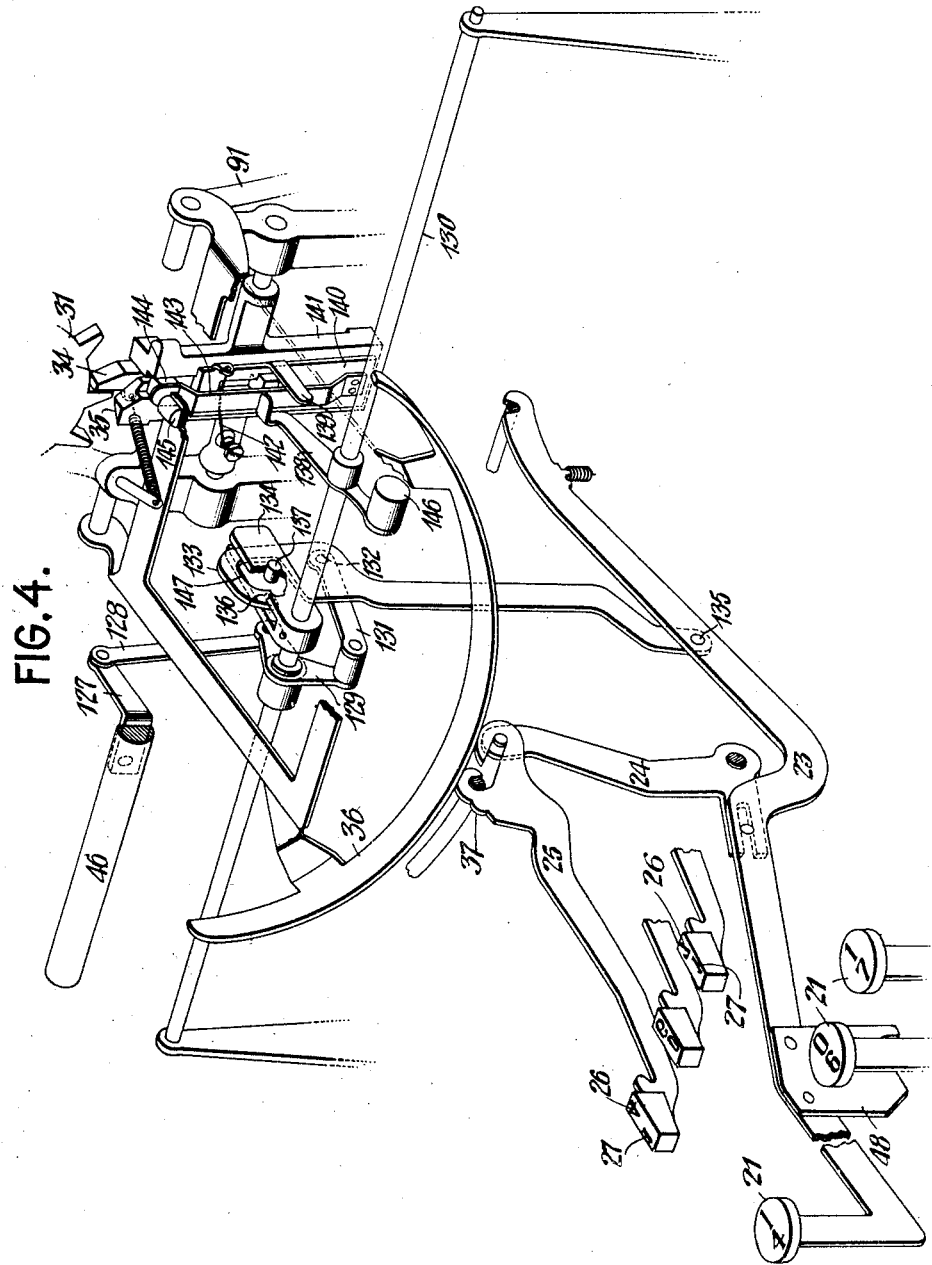
Fig. 4 is a skeleton perspective view of the typewriter escapement-controlling mechanism, and its connection to the platen shift rail.

Numeral keys 21 and alphabet keys 22 depress key-levers 23 to rock bell-cranks 24 to swing type-bars 25 upwardly and rearwardly to cause type 26, 27 thereon to print on the front side of a cylindrical platen 28 journaled on a platen frame 29 which is mounted on the traveling typewriter carriage 30 (Fig. 1). The carriage is constantly under the tension of the usual spring barrel 54, which tends to move the carriage in letter-feeding direction, said motion taking place at each depression of a character key or space key. The carriage is controlled in its step-by-step letter-feeding motion by the usual escapement wheel 31, associated with a pinion 32 meshing with a rack 33 pivoted on the typewriter carriage 30.

To move the typewriter carriage 30 in step-by-step letter-feeding direction, the heel 37 of each type-bar will move the universal frame 36 rearwardly (Fig. 2) at the end of the down-stroke of a numeral key 21, and swing therewith the dogs 34, 35, so that the loose dog 34 normally holding the escapement wheel 31 will be moved out of engagement with said escapement wheel 31 and the fixed dog 35 into engagement with said escapement wheel, so that at the subsequent forward motion of said universal frame 36, the typewriter carriage will be moved one letter-space in letter-feeding direction under the influence of the usual spring barrel 54 during the up-stroke of the numeral key 21.

The type-bars 25 for the keys 21 and 22 are each provided with two types 26 and 27, so that they control selectively the writing of two different characters. On the numeral keys, the digit type 26 are usually placed to print in lower-case position, while other characters are printed by the upper-case type 27. To effect the change from normally writing lower-case characters to writing upper-case characters, the platen 28 is mounted to be shifted from a lower-case position to an upper-case position. For this purpose, there is provided the usual shift key 43 on a lever 44, (Figs. 1, 2, 5 and 6) the rear end of which engages a shift frame 45, pivoted on the framework of the typewriter, and provided with a horizontal rail 46 on which rests a roller 47 mounted on the platen frame 29. On depression of said shift key, the rail 46 is caused to move upwardly, thus raising the platen frame 29 to bring the printing line of the platen 28 opposite the upper-case type 27 on the type-bars 25 when the latter are swung to their printing position.

The above-described mechanism is that found in the usual Underwood standard typewriting machine.

The indexing mechanism, for determining the extents of computing actions, so that they will accord with the digital values of the numeral keys as actuated, comprises parts connected to the numeral keys. These parts include an indexing cam 48 (Figs. 1, 3 and 6) on each of the numeral key levers 23 from "1" to "9." The cams 48 are each shown in the form of a plate fast to key lever, and having a cam slot 49 open at its lower end. The lower open ends of the cam slots register with a rod or bar 50 (Figs. 1 and 3), universal to all of the cams 48, said rod 50 forming the cross piece of a bail having arms 52 fast on a rock shaft 53. The bail 51 forms part of the indexing mechanism, and inasmuch as it is oscillated varying amounts, depending on the digital value of the key operated, it may be termed an oscillator. Said oscillator 51 is adapted to rotate a master wheel described below, and for this purpose (Figs. 1, 3 and 6) is provided with a pin 55 on one of its arms 52, said pin being adapted to engage a notch 56 formed in a connector 57 pivoted at 58 on a lever 59 journaled on the rock shaft 53, said connector 57 being drawn into engagement with the pin 55 by a spring 60.

At the depression of a numeral key 21, the oscillator 51 and lever 59 will be rocked an extent directly proportional to the value of said numeral key, to move downwardly therewith an upwardly-extending link 61 (Figs. 1, 3 and 6), pivoted at its lower end to the lever 59 and pivoted at its upper end to the rear end of an arm 62 fast on a rock shaft 63 to swing said rock shaft clockwise (Fig. 1) and therewith a depending arm 64 fast thereon, and having pivoted thereto at its lower end a forwardly extending link 65, the forward end of which is pivoted to the forward end of a differentially moved rack bar 66 (Figs. 1, 3, 7 and 12), to move said rack bar longitudinally forwardly extents directly proportional to the value of the numeral key depressed. To effect computations, said rack bar 66 is normally in mesh with a barrel gear 67 mounted on a shaft 68. The gear 87 has rigidly and concentrically mounted therewith a gear wheel 69 adapted to rotate a gear wheel 70 fast on the master-wheel shaft 71, either directly or through the intermediary of a change gear 72 (Fig. 12), thereby rotating a master wheel 73 also fast on the shaft 71, extents directly proportional to the value of the numeral key depressed. Said master wheel is adapted to mesh *seriatim* with computing wheels 74 of one or more totalizers 75, starting with the computing wheel of highest denomination, and passing into mesh with the computing wheels of lower denomination, as the totalizer 75 and typewriter carriage 30 move step by step in letter-feeding direction. Each computing wheel 74 is constantly in mesh with its dial wheel 76 (Figs. 12 and 13), the latter having the numerals from "0" to "9" on the periphery thereof, one numeral of each dial wheel normally appearing at the sight opening 77 in the casing of the totalizer 75 (Figs. 3 and 7).

For the purpose of performing addition, the gear 69 is shifted to effective position in mesh with the gear 85, and to do this the machine is provided with an adding key 78 (Figs. 1 and 3), mounted on a rock shaft 79 having fast thereon an upright arm 80, which, by means of a fork formed at the upper end, engages the lower end of an arm 81 fast on a rock shaft 82, the forward end of which has an arm 83 engaging an annular groove 84 formed in the shaft 68 on which are mounted the gears 67, 69, to move said gears to the Fig. 3 position at the depression of the adding key 78. It will be noted by reference to Figs. 3 and 12 that at the depression of the adding key 78, the gear wheel 69 is moved into mesh with the left-hand gear wheel 85 of the change gear 72, so that depression of a numeral key will rotate the dial wheels in adding or clockwise direction, as seen in Fig. 7.

When it is desired to subtract, the gear wheel 69 is moved out of mesh with the gear wheel 85 and into mesh with the gear wheel 70 by the depression of a subtraction key 86 (Figs. 1 and 3) also mounted on the rock shaft 79. In this position depression of a numeral key will rotate the dial wheels 76 in counter-clockwise or subtraction direction, the left-hand gear-wheel 85 and right-hand gear-wheel of the change gear 72 rotating idly during the actuation of the computing mechanism in subtraction direction.

As hereinbefore described, the rack-bar 66 is normally in mesh with the barrel gear 67 so as to rotate said barrel gear and associated gearing at the depression of a numeral key when the latter is actuated to perform a computation. In order to prevent said barrel gear and connected gearing from returning at the return stroke of the rack bar 66, the rack bar is depressed and held out of mesh with said barrel gear until the end of the return stroke of said rack bar. For this purpose, the universal frame 36 is pivoted at its rear end to a rocking frame 91 which has a fork-and-pin connection with an arm 93 fast on a rock shaft 94, which has fast thereon an arm 95 connected to a link 96, the upper end of which is pivoted to a parallel-motion device 97, which, when actuated at the rearward thrust of the universal frame 36, depresses the driving rack bar 66 out of mesh with its barrel gear 67, so that said rack bar may return idly to its normal position during the up-stroke of the numeral key actuated in a computation.

The numeral keys 21 have lower and upper-case type 26 and 27 respectively, the latter to print characters other than numerals on the work-sheet carried by the platen 28. When the numeral keys 21 are actuated to print characters other than numerals, as in upper-case position, it is advantageous to disconnect the oscillator 51, so as to leave the rack bar 66 idle. For this purpose, there is provided a lever 110 (Fig. 1) of the first order pivoted at 111 to the framework of the machine and connected by a rearwardly-extending link 112, to the lower end of a bell-crank lever 113, the upper end of which is provided with a pin 114, which normally overlies the connector 57. When the handle of the lever 110 is moved forwardly of the Fig. 1 position, the link 112 will be thrust rearwardly to swing the bell-crank 113 in counter-clockwise direction, so that its pin 114 will depress the rear end of the connector 57 against the tension of its spring 60 so as to move out of engagement the notch 56 with the pin 55 of the oscillator 51, thereby disconnecting the lever 59 from the oscillator 51, so that the motion imparted to said oscillator at the depression of any numeral key 21 will not be transmitted to the lever 59 and connected parts. When it is desired to compute while writing in upper-case position, as will hereinafter appear, the lever 110 and connected parts are left in the Fig. 1 position during the actuation of certain of the numeral keys. It may be noted in passing, that the lever 110 may be moved from the Fig. 1 position to disconnect the computing mechanism from the typewriting mechanism at any time at the will of the operator.

The mechanism thus far described is substantially the same as that described and illustrated in the said Pitman application, Serial No. 81,574, and in the said Hart application, Serial No. 70,898.

It is advantageous, when computing according to the English monetary standard, to avoid the use of additional numeral keys to compute pence. For this purpose certain keys such as, the "4," "6" and "7" numeral keys (Figs. 4 and 15) are adapted to print respectively the numerals "1," "0" and "1," when the platen is shifted to its upper-case position.

When it is desired to compute and print "10" pence, the shift key 43 is actuated to move the platen 28 to upper-case position, after which the "4" numeral key is actuated when the pence computing wheel 120 of the totalizer 75 is in mesh with the master wheel 73 to print the numeral "1" in tens of pence place upon the work-sheet, and to rotate the master wheel a four-digit distance to rotate the computing wheel 120 and a pence dial wheel 121 in mesh therewith a four-digit distance. After the actuation of the "4" numeral key, the "6" numeral key is actuated to print "0" in the units of pence place on the work-sheet and to rotate the master wheel a six-digit distance, to rotate the meshing pence computing and dial wheels 120, 121, respectively, an additional six-digit distance, thereby making a total rotation of the pence dial wheel 121 of a ten-digit distance at the combined actuation of the "4" and "6" numeral keys, the computing wheel 120 remaining in mesh with the master wheel 73 after the actuation of the "4" numeral key, as will hereinafter appear.

When it is desired to add or subtract "11" pence, the shift key 43 and the "4" numeral key 21 are actuated, as heretofore, to print "1" in tens of pence place and to rotate the pence dial wheel 121 a four-digit distance, after which the "7" numeral key is actuated to print "1" in units of pence place and rotate said pence dial wheel an additional seven-digit distance, thereby making a total rotation of eleven-digits' distance by the combined actuation of the "4" and "7" numeral keys.

It is advantageous to hold the pence computing wheel 120 in mesh with the master wheel 73 during the actuation of the "4" numeral key in tens of pence place on the work-sheet and until after the actuation of the "6," "4" and "7" numeral keys in units of pence place on the work-sheet, in order that the sum of the value of the two keys actuated in the computation of pence may be registered in the totalizer 75, and so that the carry-over action may take place from the pence element of the totalizer to the units of shillings element of said totalizer when the pence dial wheel is actuated to pass from "11" to "0" at the sight opening 77, or vice versa (Figs. 9 and 12). For this purpose, there is provided on the shift rail 46, Figs. 1 to 6 a rearwardly-extending arm 127 having pivoted thereto a link 128, the lower end of which is pivoted to one arm of a bell-crank lever 129 journaled on a rock shaft 130, the other arm of said bell-crank having a rearwardly-extending link 131 pivoted thereto, the rear end of which is pivoted at 132 to a hook 133, the upper end of which is guided in a slotted arm 134, and the lower end of which is pivoted at 135 to the "4" numeral key lever 23 (Fig. 4).

When the shift key and shift key lever 43, 44, are actuated to move the platen frame 29 to upper-case position (Fig. 5), the shift rail 46 is swung upwardly, and therewith the arm 127, to draw the link 128 upwardly to swing the bell-crank 129 in counter-clockwise direction about the shaft 130, as seen in Fig. 5, to thrust the link 131 rearwardly, and therewith the upper end of the hook 133, so that the end 136 thereof will overlie a pin 137 extending across the slot of the arm 134, so that said end 136 of hook 133 will engage the pin 137 at the depression of the "4" numeral key when actuated to print the numeral "1" in tens of pence place on the work-sheet. After the parts have been moved to the Fig. 5 position by the actuation of the shift key, the "4" numeral key is depressed (Fig. 6) to compute "10" or "11" pence and moves downwardly therewith the hook 133, so that its end 136 will engage the pin 137 to rock the frame 134 fast on the shaft 130, in clockwise direction and therewith a horizontally-disposed arm 138, the rear end of which overlies an extension 139 formed on a slide 140 slidably mounted in a rock arm 141 of the typewriter carriage escapement mechanism, and held in its upper normal position by a spring 142. Fast to the lower end of the slide 140 is a flexible upwardly-extending arm 143 which has formed on its upper end an interponent 144 (Figs. 4 and 5), which normally lies in the path of rearward motion of a lug 145 fast on the universal frame 36. At the downstroke of the "4" numeral key, the end 136 of the hook 133 will engage the pin 137 to rock the arm 134 in clockwise direction as seen in Fig. 6, and therewith the shaft 130 and arm 138, to engage and move downwardly the extension 139 of the slide 140, and therewith the interponent 144, out of the path of the rearward motion of the lug 145 before the heel 37 of the type-bar 25 associated with said "4" numeral key engages the universal frame 36 to move said frame rearwardly. Said rearward motion of the frame 36 is idle, since the interponent 144, being moved out of the path of rearward motion of said universal frame, will fail to rock the rock arm 141 to actuate the escapement mechanism of the typewriter carriage, thus causing the pence element of the totalizer to remain in mesh with the master wheel. During the up-stroke of the "4" numeral key, the hook 133 will be moved upwardly and out of engagement with the arm 134, so that the rock shaft 130 will be swung in counter-clockwise direction, as seen in Fig. 6, by force of gravity, there being provided for the purpose a counter-weight 146 fast on the arm 138. Said counter-clockwise swinging of the arm 138 will move the end thereof out of engagement with the extension 139, so that the slide 140 will be moved upwardly to its normal position by its spring 142, to move the interponent 144 into the path of rearward motion of the lug 145, so that the escapement mechanism of the typewriter carriage may be actuated at the depression of a numeral key in units of pence place, and the typewriter carriage 30 and connected totalizer 75, may be moved one space in letter-feeding direction.

It will be noted that the slide 140, rock shaft 130, and associated parts, are substantially as in Patent No. 827,726, issued to William F. Helmond August 7, 1906.

After a numeral key 21 has been actuated in units of pence place in a computation, the shift key 43 may be released to restore the platen frame 29 to its lower-case position. At this time the link 128 (Fig. 4) will be moved downwardly to rock the bell crank 129 in clockwise direction to draw the link 131 forwardly, and therewith the upper end of the hook 133, so that its end 136 will be moved out of engaging relation with the pin 137. A notch 147, formed at the upper end of said hook, will be moved over the pin 137. Said notch is so formed that the hook 133 will not engage the pin 137 of the arm 134 at the depression of the "4" numeral key (Figs. 1, 2 and 4) when the typewriter platen 28 is in its lower-case position, at which time said "4" numeral key may be actuated to add or subtract "4" in any denomination, and to cause the typewriter carriage 30 and connected totalizer 75 to move one letter-space in letter-feeding direction.

The totalizer 75, in the present embodiment of the invention, includes six dial wheels 76 of the pounds sterling order, two dial wheels of the shillings order, and one dial wheel of the pence order, the dial wheel of hundreds of pounds sterling denomination and the dial wheel of tens of shillings denomination being of an extra width, so that a punctuation mark may be printed on the work-sheet between the thousands denomination and hundreds denomination of pounds sterling, and between units of pounds sterling denomination and tens of shillings denomination, the associated computing wheels 74 being of corresponding width. The pence dial wheel 121 is of extra width, so that two numerals may be placed adjacent on a portion of its periphery, to represent "10" and "11" pence, and so that a punctuation mark may be printed on the work-sheet between the units of shillings denomination and pence, the associated computing wheel 120 being of a corresponding width for the purpose, and having gear teeth formed on its right side to mesh with the master wheel when computation and printing are taking place in tens of pence and units of pence denominations.

Since the typewriter carriage 30 and connected totalizer 75 do not move in letter-feeding direction when printing "1" in tens of pence place, it is advantageous to avoid the printing of "0" or "1" at the same point on the work-sheet as that at which the "1" was printed in tens of pence place. For this purpose, the "1" of the upper-case type 27, associated with the "4" numeral key, is offset leftwardly on its type-bar so as to print to the left of the writing point on the work-sheet, to indicate tens of pence, and the "0" of the upper-case type 27, associated with the "6" numeral key, is offset rightwardly a sufficient distance so that when the "6" numeral key is actuated to print in units of pence place, the "0" printed on the work-sheet will be placed to the right of the "1" printed by the "4" numeral key, said "1" and "0" being placed adjacent each other on the work-sheet at less than one letter-space distance apart to legibly represent "10" pence. The "1" of upper-case type 27, associated with the "7" numeral key, is offset rightwardly in similar manner as the "0" associated with the "6" numeral key, to print "1" adjacent the "1" printed by the "4" numeral key, to represent "11" pence. Said "0," associated with the "6" numeral key, and said "1," associated with the "7" numeral key, are so offset rightwardly so as not to overlap any numeral printed on the work-sheet at one letter-space rightward of the printing point at which the typewriter carriage 30 is arrested when computation is taking place in pence denominations.

In order that the single master wheel 73 may actuate all of the dial wheels, all of the computing wheels and all of said dial wheels are made in the form of gear wheels of the same pitch as the master gear wheel 73. It is advantageous to construct the pence dial wheel 121 and associated computing wheel 120, so that said dial wheel 121 will rotate a digit distance for every digit distance of rotation of the master wheel, said digit distance of the pence wheel being of the same extent along its periphery as a digit distance along the periphery of the other dial wheels. It is also advantageous that the pence dial wheel 121 and associated computing wheel 120 should be divided into a twelve-digit distance of its complete periphery. For this purpose, said computing wheel and said dial wheel are of a greater diameter than the master wheel in the proportion of twelve to ten, so that a complete revolution of the dial wheel, which is equivalent to ten-digit distance, will cause ten-twelfths of a revolution of the pence wheel, also equivalent to a rotation of a ten-digit distance.

When the pence dial wheel is actuated so that the numeral "11" thereon in addition (Fig. 9) or the numeral "0" thereon in subtraction passes the sight opening 77 of the totalizer 75, it is desirable to rotate the units of shillings dial wheel 153 one-digit distance in the same direction of rotation as that of the pence dial wheel. For this purpose, there is provided on the pence computing wheel a carry-over tooth 154 (Figs. 12 and 13), adapted to engage one of a series of carry-over pinions 155 journaled concentrically with the master wheel and adjacent to the left thereof, to rotate said carry-over pinion one-digit distance, at which time said carry-over pinion is in mesh with the computing wheel 156 associated with the units of shillings dial wheel, to rotate said computing wheel and dial wheel 156, 153, a one-digit distance, the carry-over tooth 154 being so placed relatively to the numerals of the pence dial wheel as to engage said carry-over pinion 155 at the time that the numeral "11" or "0" of the pence dial wheel passes the sight opening 77 in the hereinbefore-described manner.

The units of shillings dial wheel 153 and associated computing wheel 156, are divided into ten-digit distance spaces and are of the same diameter and gear pitch as the master wheel 73, so that a digit distance rotation of the master wheel will cause a digit distance rotation of the dial wheel 153, and a complete rotation of said master wheel will cause a corresponding rotation of the dial wheel 153, which has the numerals from "0" to "9" placed upon its periphery, which singly may be used to indicate from "0" to "9" shillings, and in combination with the tens of shillings dial wheel may be used to indicate from "10" to "19" shillings, as will hereinafter appear. The computing wheel 156 has a carry-over tooth 157 formed thereon, which is adapted to engage one of the carry-over pinions 155 in the same manner as the carry-over tooth 154 of the pence element, to rotate the tens of shillings dial wheel 158 one digit distance in a carry-over action.

The dial wheel 158 is of the same diameter as the dial wheel 153, and has the numerals "0" and "1" alternately placed on its periphery, each numeral being placed five times on said dial wheel. The computing wheel 159 associated with the dial wheel 158 has five carry-over teeth 160 formed thereon spaced at equal intervals on its periphery, and in such position relative to the numerals on the dial wheel 158, so that as a numeral "1" of the dial wheel 158 passes the sight opening 77 in addition, the associated carry-over tooth 160 will engage one of the carry-over pinions 155 to perform a tens-carrying action. Said carry-over teeth are so placed relatively to said numerals that a carry-over tooth 160 will engage said carry-over pinion 155 when "0" passes the sight opening of the totalizer in subtraction, to effect a tens borrowing action from the wheel of next higher order, namely, units of pounds sterling dial wheel 76. The dial wheels 76 and associated computing wheels 74 are of the same diameter as the shillings dial wheels 153, 158, and have carry-over teeth 161 formed thereon which engage the carry-over pinions 155, in the same manner as the carry-over teeth 154, 157 and 160, to perform carry-over actions according to the decimal system, as in said application of Henry L. Pitman, Serial No. 81,574. It will be noted by reference to Figs. 1, 7, 10 and 11 that the pence dial wheel and computing wheel being of a greater diameter, are not mounted concentrically with the other dial wheels and computing wheels, but are so journaled in the totalizer that the gear teeth of their respective computing wheels are adapted to mesh with the master wheel 73 and associated carry-over pinions 155, as seen in Figs. 7 and 12. A plate 162 interposed between the pence and shilling wheels is provided to support one end of each of the shafts on which the dial wheels and computing wheels are journaled.

The carry-over devices herein described vary somewhat from the carry-over devices in the Pitman and Hart applications, above referred to, in that, according to the present invention, there may be provided a dog 167 for each pointing-off place, as at the pence wheel and at the tens of shillings wheel, in addition to the dog which controls the carry-over detent 166 for each of said wheels. These dogs 167 at the pointing-off places are identical with the dogs 167 above described. It is an advantage, in assembling the mechanism, to have separate identical dogs for every letter-space including the pointing-off places, because such dogs 167 can be assembled on their shaft 171 irrespective of the totalizer they are to be used in, with the result that the errors of workmen in the assembling of totalizers are greatly reduced.

In order to properly control the carry-over mechanism when the dogs 167 are used at the pointing-off places, the computing wheels at such pointing-off places are modified so as to include not only the circular portions 168 and notches 169 at the left hand of said wheels, but also have a second set of circular portions 168 and notches 169 midway of said wheels, thus bringing said midway notches and circular portions at the same positions relative to the letter-spaces as the circular portions and notches on the other computing wheels bear to their letter-spaces. In other words, the pence computing wheel may be regarded as formed from a main portion 172, on which are the usual teeth including the carry-over tooth 154, and a portion or extension 173 of said wheel having on it only the extended carry-over tooth 154. In the same way, the tens of shillings computing wheel may include the main portion having on it the usual teeth including the carry-over teeth 160 and a second portion 174 of the wheel having on it only the extended carry-over teeth 160. In the case of the tens of shillings computing wheel, the midway circular portion 168 is of the same diameter as the circular portion of the other decimal-computing wheels. The pence computing wheel, however, is larger than the decimal-computing wheels, and in order to be able to coöperate with dogs 167 identical with the other dogs 167, the circular portions 170, which serve for locking the dogs 167, lie within the periphery of said wheel, with the result that the midway circular portion 170 lies at the bottom of a slot 175, and the left-hand circular portion 170 forms an annular shoulder lying considerably within the periphery of said wheel. The notches 169 in every case are cut-away sections of the circular portions 170.

It will be noted from the foregoing that the master wheel is rotated the same angular distance for every digit distance of rotation for each denomination in the totalizer, regardless of the angular rotation of the respective denominational elements of the totalizer 75. It will also be noted that a totalizer of the herein-described construction may be used to compute fractions by substituting a decimal element in place of the tens of shillings element and changing the numerals on the periphery of the pence dial wheel 121 to fractions reading from "0" in twelfths to "11/12," thus enabling the machine to compute in integral numbers and in fractions of twelfths.

The machine may be adapted to compute fractions other than twelfths by correspondingly changing the diameters of the computing and dial wheels 120, 121, and placing fractions on the periphery of the latter correspondingly.

Variations may be resorted to within the scope of the invention, and portions of the improvements may be used without others.

Having thus described my invention, I claim:

1. In a combined typewriting and computing machine, key-operated type-bars for printing a number of two digits, a totalizer comprising computing wheels adapted to be turned at each type-bar operation, a single type offset to the left of its type-bar for printing in the higher denominational position of the number, a plurality of types offset to the right of their type bars, any one of which can print in the lower denominational position of the number, escapement mechanism to determine both the printing point and the computing wheel to be turned, case-shift mechanism, and means shiftable by said case-shift mechanism and connected to a key, so that when the latter is actuated, the escapement mechanism will be rendered ineffective to change either the printing point or the computing wheel.

2. In a combined typewriting and computing machine, a set of numeral types, numeral keys for actuating said types to print a number of more than one digit, a dial wheel, means between said keys and said dial wheel for transmitting rotative movement to the latter, the extent of rotation being directly proportional to the combined value of the numerals on the actuated numeral keys, numeral-key controlled escapement mechanism, and means to prevent control of said escapement mechanism by a numeral key in printing part of said number.

3. In a combined typewriting and computing machine, a set of numeral types, keys for actuating said types to print a number of more than one digit, a dial wheel, means between said keys and said dial wheel for transmitting rotative movement to the latter, the extent of rotation being directly proportional to the combined value of the numerals on the actuated numeral keys, escapement mechanism, and means for rendering said escapement mechanism ineffective while printing part of said number.

4. In a combined typewriting and computing machine, the combination with a type-bar and types on said type-bar, of a key for operating said type-bar, a totalizer comprising computing wheels adapted to be rotated at the depression of said key, escapement mechanism adapted to determine where said types shall print and also what computing wheel shall be operated at the depression of a numeral key, a case-shift mechanism, and means controlled from the case-shift mechanism for determining whether the escapement mechanism shall be effective or ineffective when printing and computing with said key.

5. In a combined typewriting and computing machine, the combination with a type-bar and a lower-case type on said type-bar, of an upper-case offset numeral type on said type-bar, a key for operating said type-bar, a totalizer comprising computing wheels adapted to be rotated at the depression of said key, escapement mechanism adapted to determine where said type shall print and what computing wheel shall be turned, a second type-bar having an upper-case numeral type offset to the opposite side from the first type-bar, a case-shift mechanism, and means controlled from the case-shift mechanism for determining whether the escapement mechanism shall be effective or ineffective to shift the printing point or change the active computing wheel at the depression of said key.

6. In a combined typewriting and computing machine, the combination with a type-bar, of a numeral lower-case type on said type-bar, an offset upper-case numeral type on said type-bar, a key for operating said type-bar, a totalizer comprising computing wheels adapted to always be turned the same amount when turned by said key, a second type-bar comprising a lower-case numeral type and an upper-case numeral type offset to the opposite direction from the first-named offset type, a second key therefor, escapement mechanism for determining the printing point and the computing wheel at the depression of said keys, a case-shift mechanism, and means controlled from the case-shift mechanism for determining whether the escapement mechanism shall be effective or ineffective to shift the printing point or change the operated computing wheel when one of said keys is depressed.

7. In a combined typewriting and computing machine, the combination with numeral keys having characters from "0" to "9" thereon, of computing means including decimal computing wheels and a duodecimal computing wheel, a master member for actuating said computing wheels, means controlled by said keys for moving said master member through distances corresponding to the value of the key actuated, numeral-key-actuated typewriting mechanism including an escapement mechanism and a case-shift mechanism, and means whereby, upon actuation of said case-shift mechanism, and successive actuation of two of said keys, either "10" or "11" may be printed, without actuation of the escapement mechanism by the first key depressed, and the duodecimal wheel moved by the master member through ten or eleven steps, respectively.

8. In a computing machine, the combination with computing wheels and a traveling carriage, of a master wheel and carry-over devices relatively to which the computing wheels travel, detenting devices for said carry-over devices operated by said computing wheels, each detenting device operated by one computing wheel to control the next computing wheel, certain of said computing wheels being at one space from each other, and certain others of said computing wheels being at a plurality of spaces from each other, and a supplementary identical detenting device at each of said plurality of spaces, with the result that the detenting devices are spaced uniformly with the carry-over devices.

9. In a computing machine, the combination with computing wheels, of a master wheel and carry-over wheels relatively to which the computing wheels travel, detenting devices, one for every carry-over wheel which is to be effective, each detenting device constantly controlled by its own computing wheel, and a peripheral portion on each computing wheel for effecting said control, certain of said computing wheels having their axes offset from the others, said offset wheels having their peripheral surfaces adapted to engage detenting devices identical with the other detenting devices.

10. In a computing machine, the combination with a plurality of computing wheels, some of one letter-space breadth, and others of a double breadth, of a series of detenting devices controlled by said computing wheels, said detenting devices set at letter-space intervals, dogs for controlling said detenting devices at letter-space intervals, and controlling portions at letter-space intervals on said computing wheels, so that each double-breadth computing wheel controls two dogs.

11. In a combined typewriting and computing machine, the combination with a totalizer and a master wheel traveling relatively thereto, of computing wheels in said totalizer held at letter-space intervals and others at double letter-space intervals, a set of carry-over wheels fixed relatively to the master wheel at letter-space intervals therefrom, a detent for each carry-over wheel, a detent dog for each letter-space in the totalizer, and a locking means for each dog on its computing wheel, said double-space computing wheels having two locking means, one for each dog associated therewith.

12. In a combined typewriting and computing machine, the combination with a totalizer and a master wheel traveling relatively thereto, of computing wheels in said totalizer held at letter-space intervals and others at double letter-space intervals, a set of carry-over wheels fixed relatively to the master wheel at letter-space intervals therefrom, a detent for each carry-over wheel, a detent dog for each letter-space in the totalizer, a head for each dog comprising cams adapted to slide by and engage the detents successively, and a locking means for each dog on its computing wheel, said double-space computing wheels having two locking means, one for each dog associated therewith.

13. In a computing machine, the combination with computing wheels and a master wheel traveling relatively thereto, of carry-over wheels fixed relatively to the master wheel, so that the computing wheels mesh one after another with the carry-over wheels, there being a plurality of computing wheels of one width spaced apart for pointing off by a computing wheel of a double width, locking devices forming part of the carry-over mechanism, each device comprising a locking surface on a computing wheel, and connections whereby any two carry-over wheels, at the moment corresponding to a double-width computing wheel, are locked unless carrying-over.

14. In a computing machine, the combination with numeral wheels and a master wheel traveling relatively thereto, of computing wheels constantly in mesh with said numeral wheels, carry-over wheels fixed relatively to the master wheel, so that the computing wheels mesh one after another with the carry-over wheels, there being a plurality of numeral wheels of one width spaced apart for pointing off by a numeral wheel of a double width, locking devices forming part of the carry-over mechanism, each device comprising a locking surface on a computing wheel, connections whereby any two carry-over wheels, at the moment corresponding to a double numeral wheel, are locked by the locking surfaces on the computing wheels unless carrying-over, and devices for locking said carry-over wheels when not engaged with any computing wheel.

15. In a combined typewriting and computing machine, the combination with a totalizer including computing wheels, of a master wheel, means including numeral keys for actuating said master wheel, feeding means, including numeral-key-controlled escapement mechanism, for effecting a relative traveling movement between said totalizer and said master wheel, to cause the latter to mesh with the computing wheels *seriatim*, numeral-key-actuated type-bars, a single numeral type offset to the left on one of said type-bars, a plurality of numeral types offset to the right on their respective type-bars, and means, including a device to render said feeding means ineffective, whereby printing by said type offset to the left and by one of said types offset to the right may be effected, and the computing wheel in mesh with the master wheel be actuated thereby a predetermined number of steps, in accordance with each of the numeral keys depressed, the total number of steps being in accordance with the number printed.

16. In a combined typewriting and computing machine, the combination with a carriage, of numeral keys marked respectively with the characters "0" and "1" to "9," inclusive, in lower-case positions, one of said keys having the character "1" in upper-case position, a second numeral key, of the value complementary to that of the first having "0" in upper-case position, and a third key of the value one greater than said complementary value, having "1" in upper-case position, numeral-key-actuated type-bars having types corresponding to the markings on said keys, the "1" in the upper-case of the type-bar corresponding to the first key being displaced to the left, and the upper-case types on the second and third type-bars being displaced to the right, a key-controlled carriage-feed, a totalizer traveling with said carriage comprising computing wheels, one of which has thereon the markings from "0" to "11," a key-actuated master wheel with which said computing wheels are brought into mesh *seriatim*, case-shift mechanism, and means rendered effective by said case-shift mechanism, whereby actuation of said first key will render said carriage-feed inoperative, and enable printing by either of the second or third keys without carriage movement, and actuation of the same computing wheel by the master wheel in two successive movements thereof, and consequently a combined actuation of either ten or eleven steps, in accordance with the depression of the second or third numeral key.

17. In a combined typewriting and computing machine, the combination with a platen, of a type-bar having a numeral type in lower-case position, and an upper-case numeral offset thereon, means, including a numeral key, for actuating said type-bar, a second type-bar having an upper-case numeral type offset opposite to that on the first type-bar, means, including a numeral key, for actuating said second type-bar, a totalizer comprising computing wheels, numeral-key-actuated master mechanism for said computing wheels, escapement mechanism to cause a relative traveling movement between said platen and said keys, and between said totalizer and said master mechanism, a case-shift mechanism, and means, rendered effective by movement of said shift mechanism to position for upper-case printing, to prevent actuation of said escapement mechanism by said first-mentioned key, and to enable printing by said offset types and actuation of the computing wheel in operative position with respect to the master mechanism, to an extent in accordance with the sum of the values of the numeral keys depressed.

18. In a combined typewriting and computing machine, the combination with a totalizer including computing wheels, of a master wheel, means, including numeral keys, for actuating said master wheel, feeding means, including numeral-key-controlled escapement mechanism, for effecting a relative traveling movement between said totalizer and said master wheel to cause the latter to mesh with the computing wheels *seriatim*, numeral-key-actuated type-bars having lower-case numeral types in accordance with the respective numeral keys, and means to effect printing of digits, side by side, without relative movement between said totalizer and said master wheel, including upper-case numeral types on certain of said type-bars, and means rendered effective by operation of one of said type-bars having an upper-case numeral type to render said feeding means ineffective.

19. In a combined typewriting and computing machine, the combination with a totalizer, including computing wheels, of a master wheel, means, including numeral keys, for actuating said master wheel, feeding means, including numeral-key-controlled escapement mechanism, for effecting a relative traveling movement between said totalizer and said master wheel to cause the latter to mesh with the computing wheels *seriatim*, numeral-key-actuated type-bars having lower-case numeral types in accordance with the respective numeral keys, and means to effect printing of digits, side by side, without relative movement between said totalizer and said master wheel including upper-case numeral types on certain of said type-bars, case-shift mechanism and means rendered effective by said case-shift mechanism, whereby actuation of a type-bar having a numeral type in upper-case will render said feeding means ineffective.

WILLIAM L. GUMPRECHT.

Witnesses:
SAMUEL M. CAPLAN,
GEO. J. KUNEY.